Dec. 10, 1963    R. H. COLLEY ETAL    3,113,428
SILENCED JET PROPULSION NOZZLE WITH THRUST REVERSING MEANS
Filed March 10, 1958    11 Sheets-Sheet 1

United States Patent Office
3,113,428
Patented Dec. 10, 1963

3,113,428
SILENCED JET PROPULSION NOZZLE WITH
THRUST REVERSING MEANS
Rowan Herbert Colley and Peter Arthur Ward, Littleover, England, assignors to Rolls-Royce Limited, Derby, England, a British company
Filed Mar. 10, 1958, Ser. No. 720,140
Claims priority, application Great Britain Mar. 13, 1957
2 Claims. (Cl. 60—35.54)

This invention comprises improvements in or relating to jet-propulsion nozzle arrangements, and has for an object to provide a construction of jet-propulsion nozzle which will enable the intensity of the noise produced in operation to be materially reduced and will also enable a "reverse thrust," that is a thrust which may be employed for braking, to be obtained.

According to the present invention, a jet-propulsion nozzle arrangement comprises a tubular structure through which the propulsive gases flow to atmosphere, said tubular structure providing internally thereof a cross-sectional area which decreases from the upstream end of the tubular structure to a throat, the decreasing cross-sectional area being obtained by the provision of a selected number of circumferentially-spaced hollow structures which define in the propulsion gas path a corresponding number of channels for the flow of the propulsive gas, each of said hollow structures being open at its downstream end and having an outlet to atmosphere at the periphery of the tubular structure, and means adjustable from an inoperative position in which the gas flow from the channels is rearwards to atmosphere and is uninterrupted, and an operative position in which gas flowing rearwards from the channels is intercepted and deflected to enter in part at least the hollow structures at their downstream ends and to flow to atmosphere through their peripheral outlets thereby to produce a reverse thrust.

In one preferred arrangement, the tubular structure comprises a tubular extension downstream beyond the downstream ends of the hollow structures, and said adjustable means comprises a plurality of rotatable shutters which are mounted in the extension and which have an inoperative position in which they do not present substantial impediment to the gas flowing in the nozzle, and an operative position in which they block the flow path through the extension so constraining the propulsive gases leaving the channels to flow in the reverse direction into the hollow structures through their open downstream ends. There may for instance be one shutter aligned with each hollow structure, the shutter being pivoted about a radial axis to swing between an inoperative position in which its plane is parallel to the nozzle axis, and an operative position in which its plane is transverse to the axis and its radial edges coincide with corresponding edges of adjacent shutters thereby to block the flow through the extension. Alternatively, the shutters may be pivoted about axes substantially tangential to the nozzle at its periphery to swing inwards towards the nozzle axis into the operative position.

In another preferred arrangement, the adjustable means comprises a plurality of part-tubular flaps which in their inoperative positions lie externally of the nozzle and in their operative positions co-operate downstream of the channels to define a chamber into which the channels deliver the propulsive gases and from which the gases flow into the hollow structures to be discharged to atmosphere to produce a reverse thrust. For instance the part-tubular flaps may be pivoted at the downstream end of the tubular structure to swing about a chordwise axis, and may have each a first portion extending upstream from its pivots, which portions extend about the tubular structure in the inoperative positions of the flaps and overlie the peripheral outlets of the hollow structures, and a second portion extending downstream from the pivots, the second portions of the flaps in the operative positions of the flaps co-operate to define a substantially conical chamber downstream of the channels.

The number of hollow structures employed is selected to give a reduced noise level in accordance with the principles set out in British patent specification No. 768,553 (Rolls-Royce Limited).

Some constructions of jet-propulsion nozzle according to this invention will now be described with reference to the accompanying drawings, in which.

Figure 1:
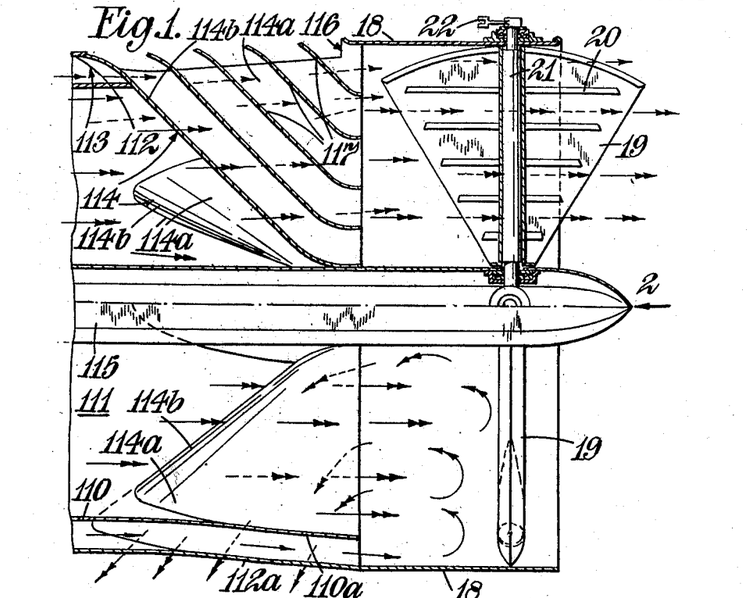
FIGURE 1 is an axial section through a first construction.
Figure 2:
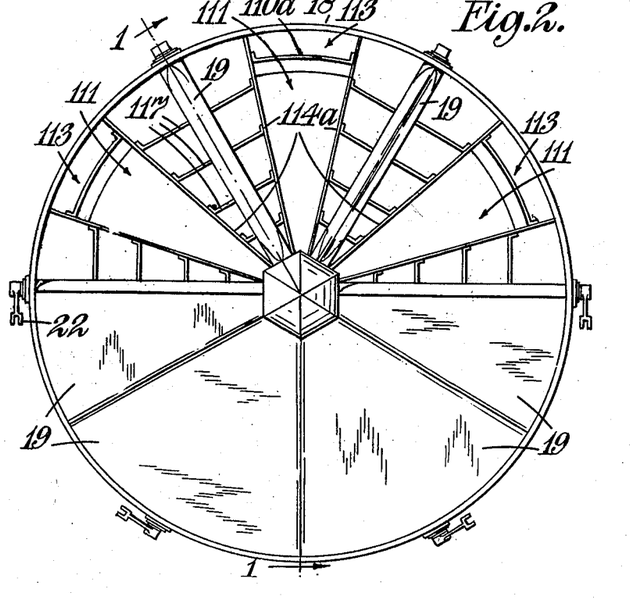
FIGURE 2 is a view in the direction of arrow 2 on FIGURE 1, the section line 1—1 for FIGURE 1 being indicated on this figure.

Referring to FIGURES 1 and 2, the jet-propulsion nozzle illustrated is suitable for use with a by-pass gas-turbine engine and is at the outlet end of a jet pipe having an inner wall 110 defining an exhaust-gas passage 111 and an outer wall 112 defining with the wall 110 an annular by-pass air passage 113. Each of the walls 110, 112 has a divergent generally tubular portion 110a, 112a respectively at its downstream end which portions form the tubular structure of the nozzle.

The nozzle also comprises a plurality of equi-angularly-spaced hollow structures 114 each of which extends radially inwards from the wall portion 112a through the wall portion 110a to a centrally-arranged support tube 115 and each of which comprises a pair of circumferentially-facing walls 114a which meet in an edge 114b and diverge from the edge, so that each hollow structure presents a cross-sectional area which increases in the direction of gas flow through the nozzle. The dimensions of the wall portions 110a, 112a and the hollow structures 114 are selected so that the total cross-sectional area for flow of gas and of air in the passages 111 and 113 respectively decreases continuously from the upstream end of the nozzle to a throat at the downstream ends of the hollow structures 114. Also it will be seen that the structures 114 define between them circumferentially-spaced channels for the gas and air flow which channels have sector-shaped outlets at the downstream ends of the hollow structures 114. The number of hollow structures 114 provided is selected to effect a reduction of the noise level as compared with an equivalent plain convergent nozzle. For instance in the illustrated construction there are six hollow structures 114.

Each of the hollow structures is open at its downstream end and its interior communicates through an outlet 116 in the wall portion 112a with atmosphere. Each hollow structure 114 also accommodates a cascade of guide vanes 117.

The nozzle also comprises a cylindrical downstream extension 18 of the wall portion 112a and the extension has mounted in it a plurality of pivoted shutters 19, there being one such shutter 19 to each hollow structure. Each shutter 19 is sector-shaped and comprises a pair of sheet metal walls separated by strengthening members 20 and mounted on a spindle 21 which is journalled in the extension 18 and support tube 115 to rotate about a radial axis contained in the central axial plane of the associated hollow structure 114. Each spindle 21 is fitted with an operating arm 22 operated by suitable motor means, such as a pneumatic ram (not shown).

The shutters 19 are arranged to swing from an inoperative position (shown in the top halves of FIGURES 1 and 2) to an operative position (shown in the lower halves of FIGURES 1 and 2). In their inoperative positions, the shutters 19 lie in the central axial planes of the hollow structures 114 and so offer no substantial blockage to the flow of gas and air leaving the channels between the hollow structures 114, and thus the gas and air flows rearwardly in the form of a silenced propulsive jet for propelling forwardly the vehicle (say an aircraft) fitted with the nozzle arrangement. In their operative positions, the shutters 19 have their edges coincident and thus block completely the flow of gas and air through the extension 18 so that the gas and air is constrained to pass into the hollow structures 114 through their open downstream ends and to leave the nozzle through the outlets 116 as a series of jets having a forward component of velocity, thereby to apply a reverse or braking thrust to the vehicle.

It will be seen that large forces will not be required to operate the shutters 19 since in pivoting in either direction, one half of each shutter 19 is moving against the gas and air streams and the other half is moving with the streams so that the gas loads tend to be balanced.

The air flow is indicated by single headed arrows and the gas flow by double headed arrows.

Figure 3:
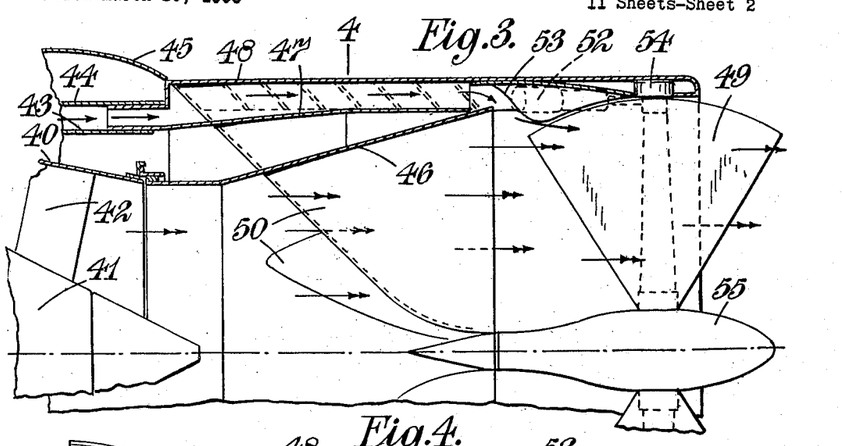
FIGURE 3 is a view corresponding to FIGURE 1 of a second construction.
Figure 4:
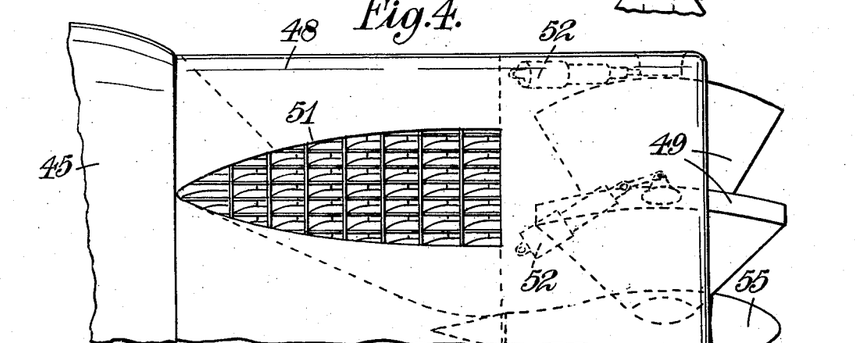
FIGURE 4 is a view in the direction of arrow 4 on FIGURE 3.

Referring now to FIGURES 3 and 4, there is shown a construction similar to that of FIGURES 1 and 2. In this construction, the engine exhaust structure is shown and it comprises an outer exhaust gas duct wall 40 and a central bullet 41 supported by struts 42 from the wall 40, a by-pass air duct having an inner duct wall 43 and an outer wall 44. There is also shown the engine fairing 45 which encloses the engine and has its downstream edge substantially coplanar with the ends of walls 40, 43, 44.

The propelling nozzle is a detachable structure comprising a frusto-conical wall 46 which forms a divergent extension of wall 40, a wall 47 which forms a continuation of the by-pass air duct wall 43 and meets the wall 46 at its downstream end, and a cylindrical wall 48 which extends from the fairing 45 to form with the wall 47 an extension of the by-pass air duct. The wall 48 also extends beyond the ends of walls 46, 47 and houses pivoted shutters 49. The nozzle also includes hollow structures 50 of a form similar to the structures 114 of FIGURES 1 and 2, and these structures 50 are open at their downstream end and are open to atmosphere at the outside of the nozzle through ports 51 in the wall 48.

The shutters 49 are operated by rams 52 housed in blister structures 53 on the inner surface of the wall 48 and are journalled at their outer ends in bearings 54 and at their inner ends in a streamlined body 55 to the upstream end of which the inner ends of the structures 50 are secured.

The operation of the nozzle is similar to that of FIGURES 1 and 2, the shutters 49 being swung from an inoperative position as illustrated to a flow-blocking position in which the exhaust gas and by-pass air flows through the structures 50 and ports 51 to atmosphere to produce a reverse thrust.

Figure 5:
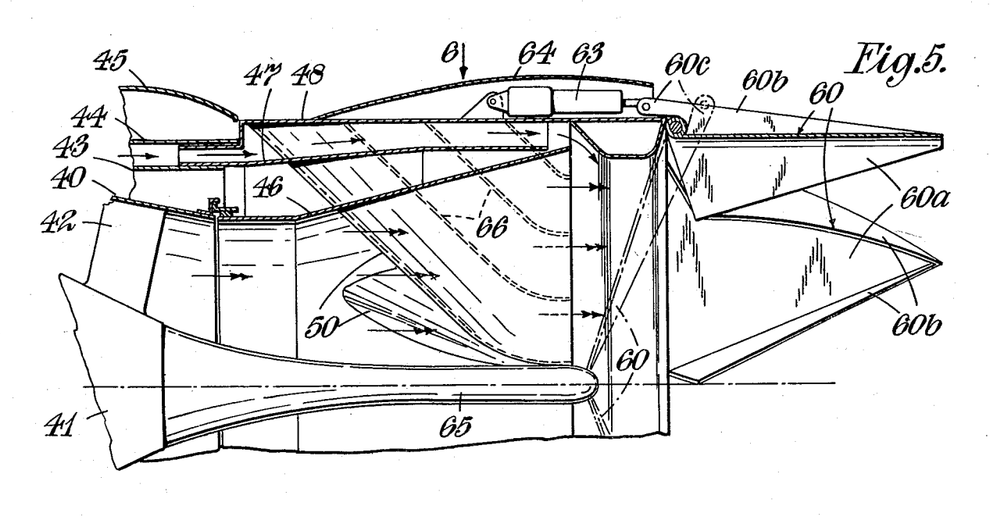
FIGURE 5 is an axial section through a third construction.
Figures 6, 7:
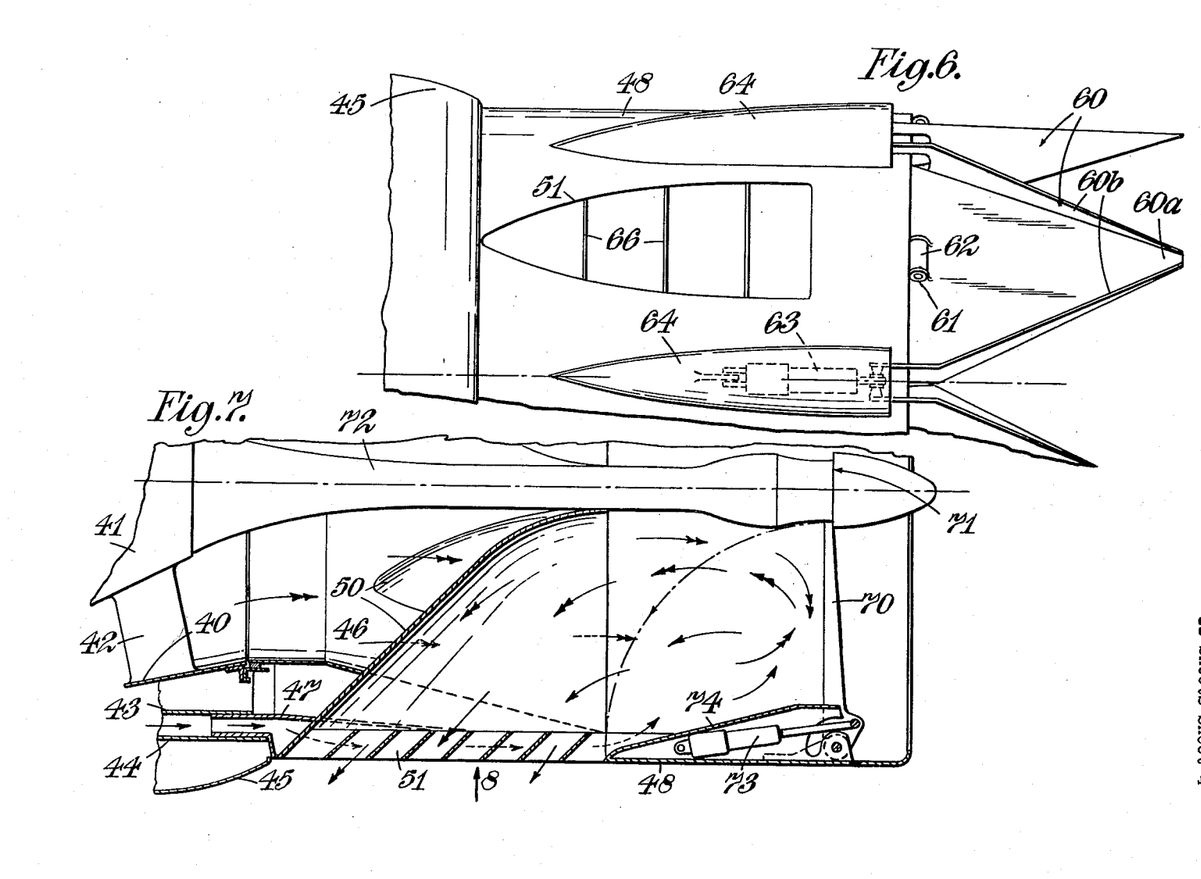
FIGURE 6 is a view in the direction of arrow 6 on FIGURE 5.
FIGURE 7 is an axial section through a fourth construction.

Referring to FIGURES 5 and 6, a construction similar to FIGURES 3 and 4 is shown, except that in this construction, the shutters 60 are pivoted to swing about axes which are tangential to the wall 48 to swing between an inoperative position shown in full lines in FIGURES 5 and 6 to an operative position in which they block off the flow through the nozzle, this position being shown in chain lines in FIGURE 5.

The shutters 60 are of triangular form and have a curved main wall 60a carrying bored lugs 61 by which they are pivoted to brackets 62 secured to the downstream end of the wall 48, and a pair of side walls 60b extending from adjacent the downstream end of the wall 48 to the apices of the shutters. The shutters 60 are caused to swing by rams 63 housed in blisters 64 secured to the exterior surface of the wall 48, the ram pistons being connected to the shutters through lugs 60c at the upstream ends of the side walls 60b. It will be seen from FIGURES 5 and 6 that the lugs project to within the blisters 64.

In the operative position of the shutters 60 the apices abut the downstream end of an extension 65 of the bullet 41 of the engine exhaust structure. It will also be seen that the hollow structures 50 contact the extension 65 of the bullet at their radially inner ends.

The operation of the nozzle is similar to that of the previously described constructions. When the shutters 60 are in full line positions the exhaust gases and by-pass air flow rearwardly from the nozzle in an unobstructed path, and when the shutters 60 are in their operative positions (chain lines, FIGURE 5) the rearward flow of the gases is prevented and the gas is turned to flow through the hollow structures 50 and thence to atmosphere through the apertures 51 in the wall 48.

As in the previous constructions the hollow structures may be provided with internal vanes such as 66 for assisting in directing the gas flow from the structures with a component of velocity in the forward direction.

Figure 8:
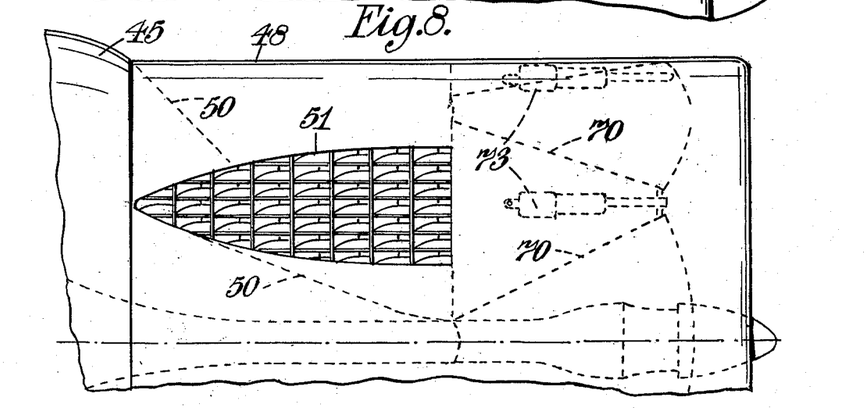
FIGURE 8 is a view in the direction of arrow 8 on FIGURE 7.

Referring now to FIGURES 7 and 8, there is shown a further construction which is similar to the construction just described, in that the shutters for blocking the flow through the nozzle are pivoted to swing about axes tangential to the nozzle periphery. In this construction, however, the wall 48 extends a somewhat greater distance downstream from the downstream ends of the structures 50 than in the construction of FIGURES 5 and 6, and the shutters 70 swing so that in their inoperative positions they lie against the downstream portion of the wall 48 and do not project from the end of the nozzle as do the shutters 60 when in their operative position.

In FIGURE 7 the shutters 70 are shown in their operative positions and it will be seen that they extend substantially radially from the wall 48 and bear by their radially inner edges against an upstream-facing shoulder 71 provided on an extension 72 of the bullet 41 of the engine exhaust structure. The shutters 70 are operated by rams 73 housed in blisters 74 secured to the internal surface of the wall 48 axially in line with the hollow structures 50. As will be seen from FIGURE 8, in their inoperative positions the shutters 70 lie against the internal surface of the wall 48 and in swinging from their operative positions to their inoperative positions, they move against the gas flow.

Figure 9:
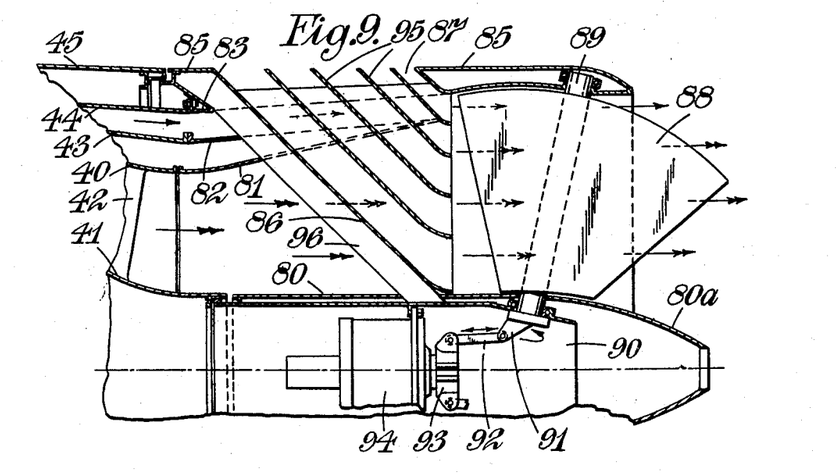
FIGURE 9 is an axial section through a fifth construction.

Referring now to FIGURE 9, there is shown another nozzle arrangement suitable for use with a by-pass gas-turbine engine.

The exhaust structure of the engine is again indicated by the same reference numerals as are employed in FIGURES 3 to 8, and the engine fairing is again indicated at 45. It will be seen that in this construction the central bullet 41 of the exhaust structure is frusto conical and the nozzle has a cylindrical central member 80 affording a continuation of the bullet 41 and terminating in a tapered portion 80a at the outlet of the nozzle.

The nozzle also comprises an outer wall 81 defining with the cylindrical central member 80 an exhaust gas duct, inner and outer by-pass air duct walls 82, 83 respectively affording continuations of the walls 43, 44 and a fairing wall 85 affording a continuation of the fairing 45. The nozzle also comprises a number of hollow structures 86 which are similar to the hollow structure 114 and 50 above described. The hollow structures 86 have their downstream ends at a substantial distance upstream from the downstream end of the fairing 85, are open at their downstream ends to the space within the downstream portion of the fairing 85 and are open to atmosphere at their radially outer ends through apertures 87 in the fairing 85.

In this construction the nozzle also comprises a series of shutters 88 which are carried on spindles 89 which are journalled in the downstream end of the fairing 85 and also in a tubular support member 90 housed within the tubular member 80, and the shutters swing about axes which are slightly inclined to lines radial to the nozzle axis. The spindles 89 are provided at their inner ends with operating arms 91 which are connected by links 92 to an operating member 93 which is rotatably driven by a motor 94 housed within a tubular support member 90. On rotation of the member 93 the shutters 88 are rotated from the position shown in FIGURE 9 to an operative position in which the shutters together block-off the outlet from the fairing 85. Thus, as in the previous construction, with the shutters 88 in the position shown the exhaust gases from the engine and the by-pass air flow rearwardly in an unobstructed prior path to produce a normal propulsive jet, and with the shutters rotated through 90° from the position illustrated the shutters block-off the rearward flow of exhaust gases and by-pass air which is thereby constrained to flow through the hollow structures 86 and thence to atmosphere through the outlets 87 to produce a reverse thrust.

As in the previous constructions the hollow structures contain vanes 95 for assisting in directing the gas issuing through the outlets in an upstream direction.

The tubular support member 90 may be supported from the cool fairing structure 85 by means of struts 96 extending along the leading edges of the hollow structures 86.

Figure 10:
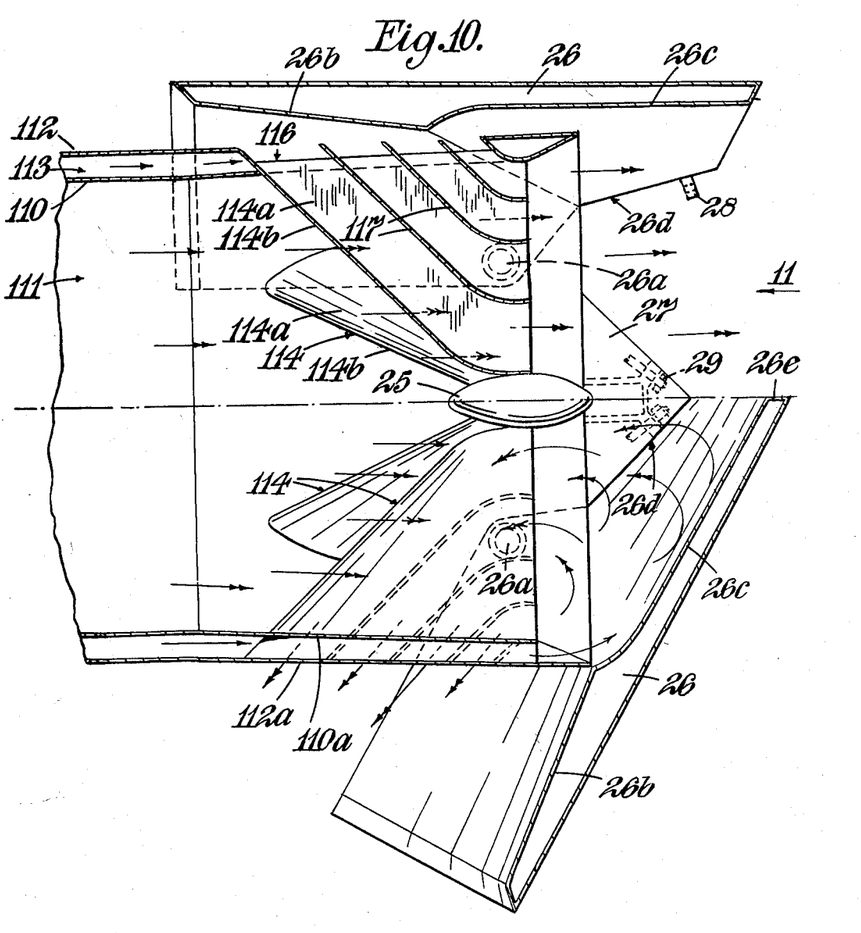
FIGURES 10 and 11 are corresponding views of a sixth construction, FIGURE 11 being a view in the direction of arrow 11 on FIGURE 10, and FIGURE 10 being a section on line 10—10 of FIGURE 11, FIGURES 12 and 13 are corresponding views of a seventh construction, FIGURE 13 being a view in the direction of arrow 13 on FIGURE 12 and FIGURE 12 being a section on the line 12—12 of FIGURE 13.
Figure 11:
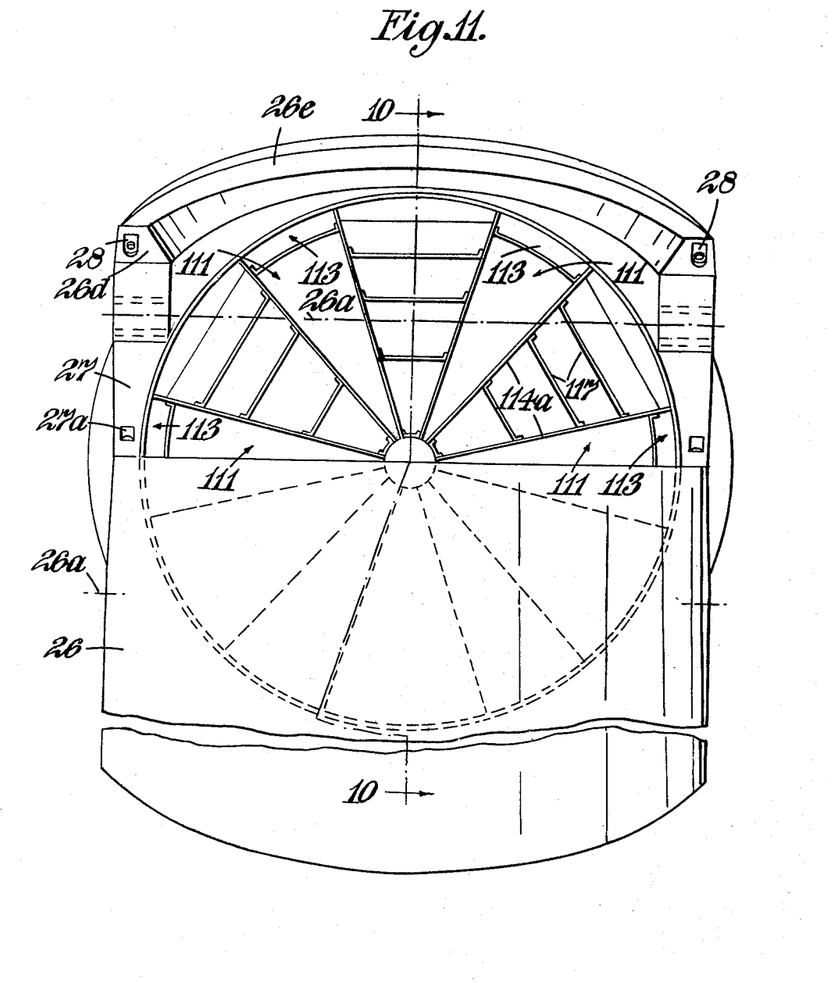

Referring now to FIGURES 10 and 11, the nozzle is of generally similar construction to that shown in FIGURES 1 and 2, except in respect of the means for reversing the gas flow to flow to atmosphere through the hollow structures 114. Also instead of a central support tube 115, there is provided at the centre of the nozzle, a streamlined boss 25 to which the inner ends of the hollow structures 114 are attached.

The means for reversing the gas and air flow comprises in this construction a pair of part-tubular flaps 26 pivoted to the external surface of the tubular structure at opposite sides of the nozzle to swing about parallel axes 26a which extend chordwise of the nozzle.

Each flap is a hollow structure and has a portion 26b extending forwards from the pivots and a portion 26c extending rearwardly from the pivots, and each swings from an inoperative position (shown in the upper halves of FIGURES 10 and 11) to an operative position (shown in the lower halves of FIGURES 10 and 11).

In their inoperative positions, the flaps 26 lie wholly outside the path of the gas and air flowing from the channels between hollow structures 114, and the forward portions 26b thereof cover the outlets 116 from the hollow structures 114.

In the operative positions of the flaps 26, the lateral edges 26d of the rearward portions 26c come into contact with triangular ears 27 projecting downstream from the nozzle and their end surfaces 26e come together, thus defining a substantially conical closed space into which flow the gas and air from the passages 111, 113. Thus the gas and air is constrained to flow into the hollow structures 114 through their open downstream ends and thence to atmosphere through outlets 116. The forward portions 26b of the flaps extend forwardly and outwardly and assist to direct the gas and air issuing from the outlets 116 in the forward direction.

In order to hold the flaps 26 in their operative position each is provided with a bored keeper piece 28 which enters a recess 27a in the adjacent ear 27 and is there engaged by a locking pin 29 housed within the ear 27. The locking pins may be operated, for example, by rams (not shown).

Figure 12:
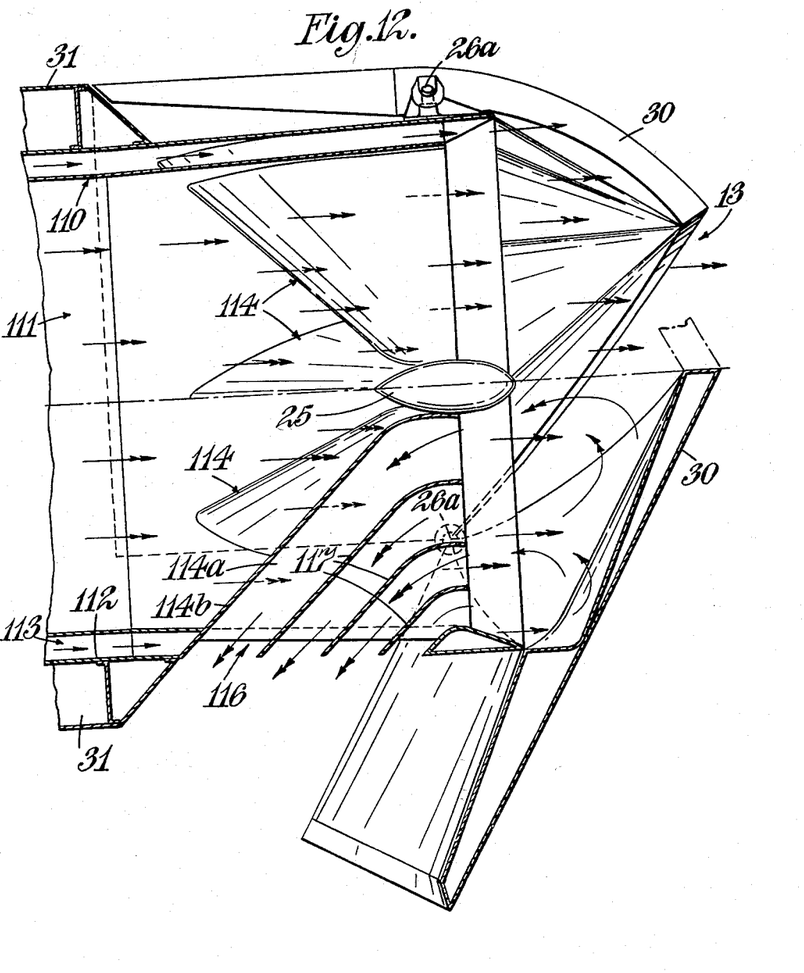
Figure 13:
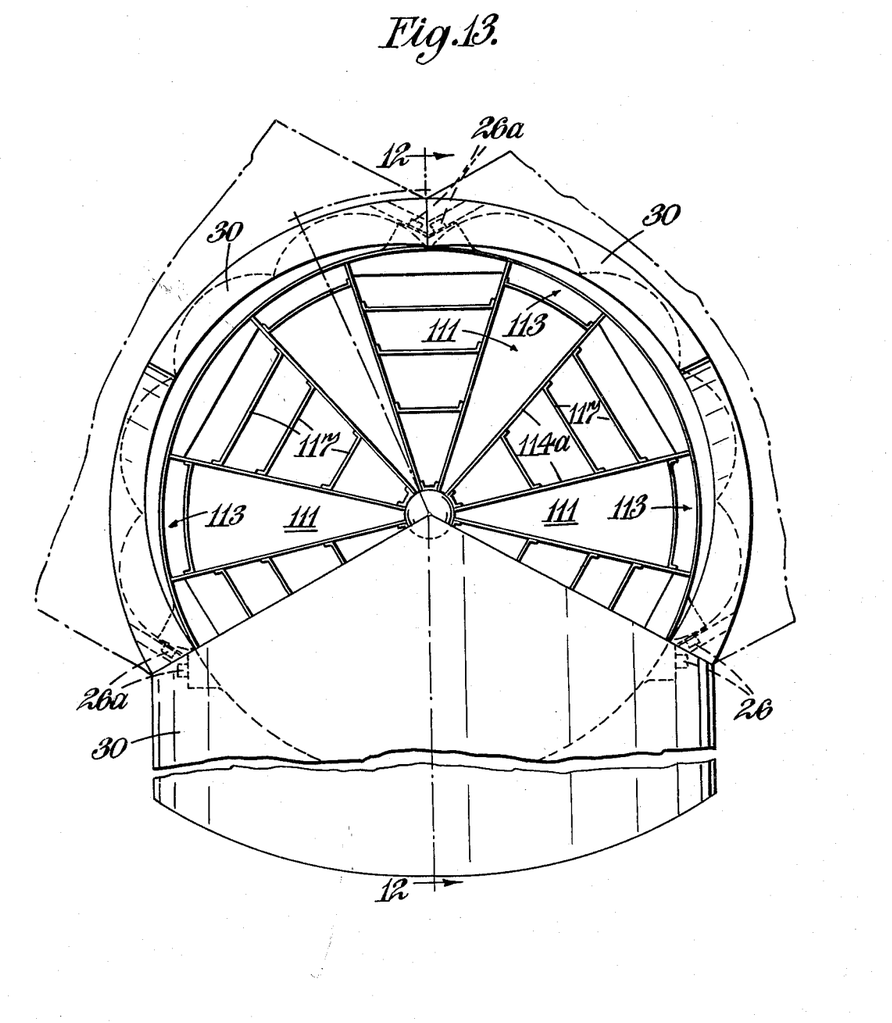

Referring now to FIGURES 12 and 13, there is illustrated an arrangement similar to the arrangement of FIGURES 10 and 11. However, in this construction, the ears 27 are omitted and there are three pivoted part-tubular flaps 30, the rearward portions of which co-operate to form a substantially conical closed space when the flaps are in their operative positions. The chordwise pivotal axes of the flaps 30 are at angles of 60° to one another. It will be seen that when the flaps are in their inoperative positions, the forward portions of the flaps 30 co-operate with the structure 31 wherein the nozzle is mounted to form a smooth continuation of this structure enveloping the nozzle.

Figure 14:
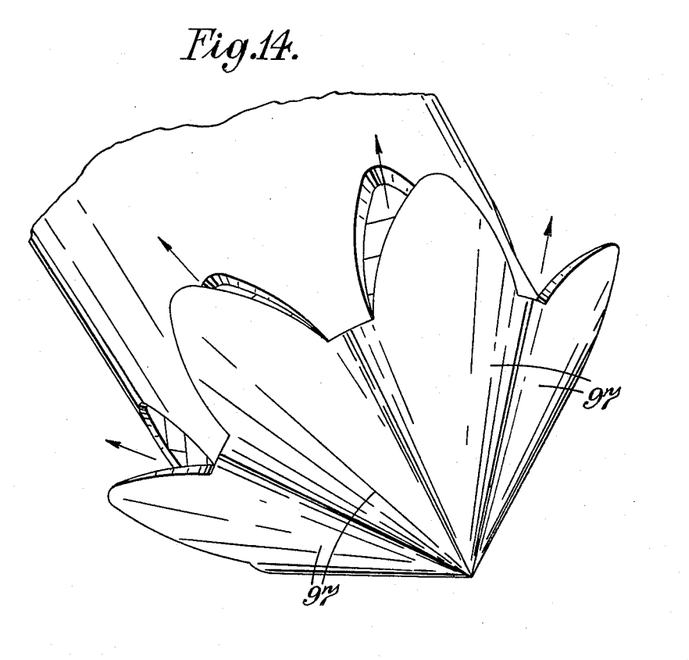
FIGURE 14 is a perspective view of an eighth construction.
Figure 15:
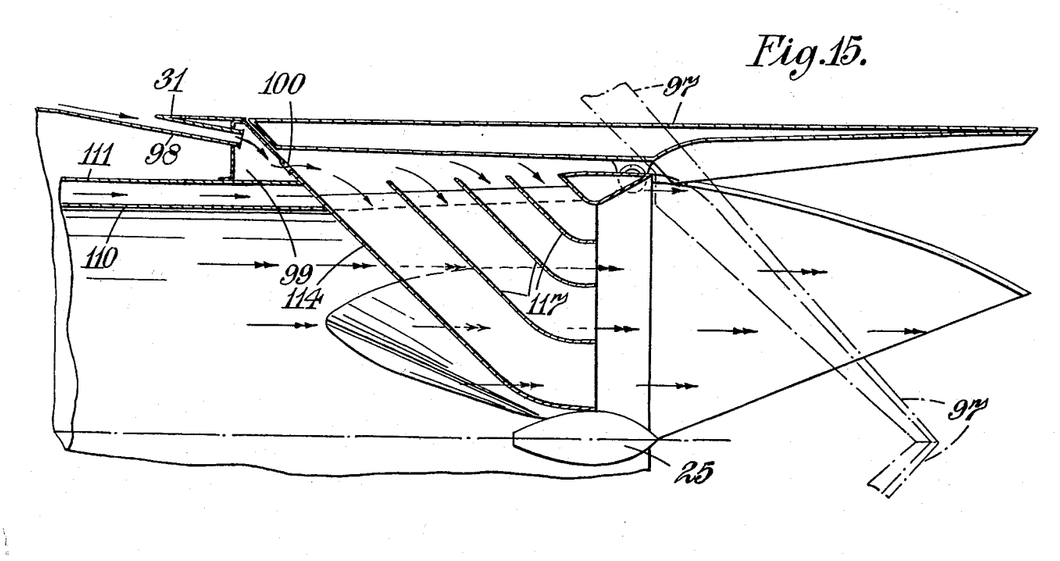
FIGURE 15 is an axial section through the construction of FIGURE 14.

Referring now to FIGURES 14 and 15, there is illustrated an arrangement which is similar to the construction shown in FIGURES 12 and 13. In this construction, however, instead of having three flaps as shown in FIGURES 12 and 13, there are provided six part-tubular flaps 97 which in their operative positions shown in FIGURE 14 together form a conical structure blocking the outflow of gas in the rearward direction from the nozzle. The pivotal axes of the flaps define a regular hexagon. Another important feature illustrated in this construction is the provision of means to allow cooling air to flow through the hollow structures 114 when the nozzle is operating normally. For this purpose the structure 31 is provided with a series of inclined tubes 98 having inlets thereto in the outer surface of the structure 31 and outlets therefrom into an annular manifold 99 encircling the nozzle. The air flows from the manifold through ports 100 into the hollow structures 114 and thus passes to atmosphere through the downstream-facing ends of the structures. It will be appreciated that the passage of the exhaust gases at high speed through the nozzle will cause the air to flow through the tubes 98 into the manifold 99 and thus through the ports 100 and hollow structures 114 to be carried rearwardly with the exhaust gases.

Figure 16:
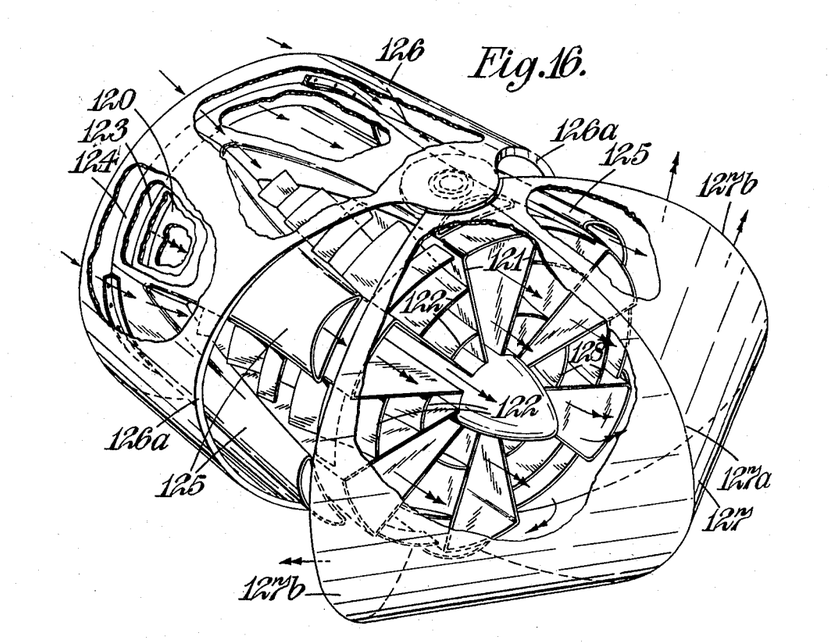
FIGURE 16 is a perspective view of a ninth construction, parts being broken away to show details of construction.

Referring now to FIGURE 16, there is shown a construction of nozzle in which the members for blocking the rearward flow of the gases when it is desired to obtain a reverse thrust, are in the form of clamshells.

As in previous constructions the engine exhaust gas flows in a path between an outer wall 120 into a nozzle having a series of peripheral channels defined between hollow structures 121. The structures 121 are constructionally similar to the structures 114 and have fitted in them cascades of vanes 122.

The by-pass air flows from the engine in an annular passage defined between walls 123 and 124, and is delivered into a series of crescent-section tubes 125 which are radially aligned with the spaces between the structures 121.

The jet pipe of the engine and the upstream portion of the nozzle are enclosed in a cowling 126, to the downstream edge of which a pair of clam shell members 127 are pivoted to swing about a diametral axis. The clam shell members 127 are arranged to occupy an operative position (shown in the drawing) in which their edges 127a are in abutment and the gas and by-pass air are prevented from flowing rearwardly and are deflected to flow from the nozzle with a component of velocity in the forward direction, at least part of the issuing gases passing back through the hollow structures 121 being guided in their flow through these hollow structures by vanes 128. The clam shell members 127 may be swung from their operative position just described to an inoperative position in which their edges 127b mate with cutaways 126a in the downstream edge of the cowling 126 and with the clam shell members in this position the exhaust gases from the engine and the by-pass air flows rearwardly in an unobstructed path.

It will be seen that in each of the constructions above described there is provided a simple construction of silenced nozzle with which a reverse thrust may be obtained.

We claim:
1. A jet propulsion nozzle arrangement comprising a tubular structure through which the propulsive gases flow to atmosphere, said tubular structure providing internally thereof a cross-sectional area which decreases from the upstream end of the tubular structure to a throat, the decreasing cross-sectional area being obtained by the provision of a selected number of fixed circumferentially-spaced hollow structures, the spaces between said hollow structures defining in the propulsive gas path a corresponding number of channels between said hollow structures for the flow of the propulsive gas to produce a noise attenuating effect, each of said hollow structures being open at its downstream end and having a radial outlet to atmsphere at the periphery of the tubular structure, the open downstream end and the outlet to atmosphere being connected by a flow path through the hollow structure, and means spaced axially downstream from said hollow structures and adjustable from an inoperative position in which the gas flow from the channels is rearwards to atmosphere and is uninterrupted, and an operative position in which gas flowing rearwards from the channels is intercepted and deflected forwardly to enter in part at least the hollow structures at their downstream ends and to flow to atmosphere through their peripheral outlets thereby to produce a reverse thrust, said tubular structure comprising a tubular extension downstream beyond the downstream ends of the hollow structures, and said adjustable means comprises a plurality of pivotable shutters which are mounted in the extension and which have an inoperative position in which they are out of the path of the gas flowing in the nozzle, and an operative position in which they block the flow path through the extension so constraining the propulsive gases leaving the channels to flow in the reverse direction into the hollow structures through their open downstream ends, one shutter of approximately the full length of the tubular extension being aligned with each hollow structure and being pivoted about a radial axis to swing between an inoperative position in which its plane is parallel to the nozzle axis, and an operative position in which its plane is transverse to the axis and its radial edges coincide with corresponding edges of adjacent shutters thereby to block the flow through the extension.

2. A jet propulsion nozzle arrangement according to claim 1, for a by-pass gas turbine engine, wherein the tubular structure comprises a wall defining an exhaust gas duct and wall means defining a by-pass air duct surrounding the exhaust gas duct, said hollow structures extending across both the exhaust gas duct and the by-pass air duct and the adjustable means when operative causing both exhaust gas and by-pass air to flow through the hollow structures to atmosphere.

References Cited in the file of this patent
UNITED STATES PATENTS

| | | |
|---|---|---|
| 2,847,822 | Hausmann | Aug. 19, 1958 |
| 2,847,823 | Brewer | Aug. 19, 1958 |
| 2,848,867 | Hausmann | Aug. 26, 1958 |
| 2,886,946 | Parker | May 19, 1959 |
| 2,940,252 | Reinhart | June 14, 1960 |

FOREIGN PATENTS

| | | |
|---|---|---|
| 103,325 | Great Britain | Jan. 19, 1917 |
| 764,907 | Great Britain | Jan. 2, 1957 |